(12) United States Patent
Nonomiya et al.

(10) Patent No.: US 6,634,713 B2
(45) Date of Patent: Oct. 21, 2003

(54) RECLINING APPARATUS

(75) Inventors: Masaaki Nonomiya, Yokohama (JP); Isao Hayashi, Ayase (JP)

(73) Assignees: NHK Spring Co., Ltd., Kanagawa (JP); Johnson Controls Automotive System Corporation, Kanagawa (JP)

( * ) Notice: Subject to any disclaimer, the term of this patent is extended or adjusted under 35 U.S.C. 154(b) by 0 days.

(21) Appl. No.: 10/012,371

(22) Filed: Dec. 12, 2001

(65) Prior Publication Data

US 2002/0070596 A1 Jun. 13, 2002

(30) Foreign Application Priority Data

Dec. 12, 2000 (JP) .......................... 2000-377105

(51) Int. Cl.⁷ .............................................. B60N 2/235
(52) U.S. Cl. ........................................................ 297/367
(58) Field of Search ................................ 297/365–368, 297/378.12

(56) References Cited

U.S. PATENT DOCUMENTS

| | | | | |
|---|---|---|---|---|
| 4,087,885 | A | * | 5/1978 | Gillentine .................... 297/367 |
| 5,664,837 | A | * | 9/1997 | Takagi ......................... 297/367 |
| 5,816,656 | A | | 10/1998 | Hoshihara et al. ........... 297/367 |
| 6,092,874 | A | * | 7/2000 | Kojima et al. ............... 297/367 |
| 6,332,649 | B1 | * | 12/2001 | Vossmann .................... 297/366 |

OTHER PUBLICATIONS

Patent Abstracts of Japan, vol. 2000, No. 14, Mar. 5, 2001 & JP 2000 325170 A, Nov. 28, 2000.
Patent Abstracts of Japan, vol. 1997, No. 07, Jul. 31, 1997 & JP 09 084650 A, Mar. 31, 1997.
Patent Abstracts of Japan, vol. 1996, No. 12, Dec. 26, 1996, & JP 08 196370 A, Aug. 6, 1996.

* cited by examiner

*Primary Examiner*—Peter R. Brown
(74) *Attorney, Agent, or Firm*—Arent Fox Kintner Plotkin & Kahn, PLLC (57) ABSTRACT

The invention provided a reclining apparatus is provided with a fixed plate in which a guide portion having a pair of mutually opposing guide walls is provided, a shaft provided in the fixed plate so as to freely rotate around an axis in a horizontal direction, a rotary plate relatively rotating around the shaft with respect to the fixed plate and in which an internal gear is provided along a circular arc around the shaft, a slide gear received between respective guide walls of the guide portion and freely moving between a lock position engaged with the internal gear and a lock canceling position moving apart from the internal gear, and a cam member mounted to the shaft and rotated by the shaft, thereby moving the slide gear to the lock position and the lock canceling position. A wall portion protruding to a side of the internal gear and a side of the guide portion in a plan view is provided in the slide gear, and a side surface of the wall portion is slidably in contact with the guide portion.

5 Claims, 8 Drawing Sheets

RELATED ART

RECLINING APPARATUS

BACKGROUND OF THE INVENTION

1. Technical Field

The present invention relates to a reclining apparatus suitable for adjusting an angle of incline of a seat back, for example, in a seat for an automobile.

2. Background Art

Figure 6:
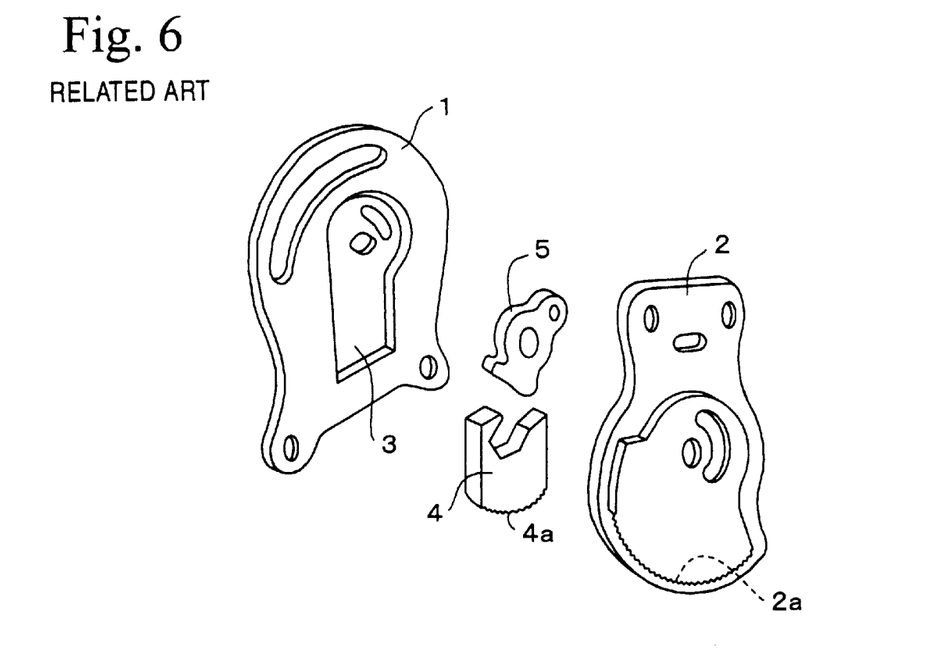
FIG. 6 is a perspective view showing an embodiment of a conventional reclining apparatus.
Figure 7:
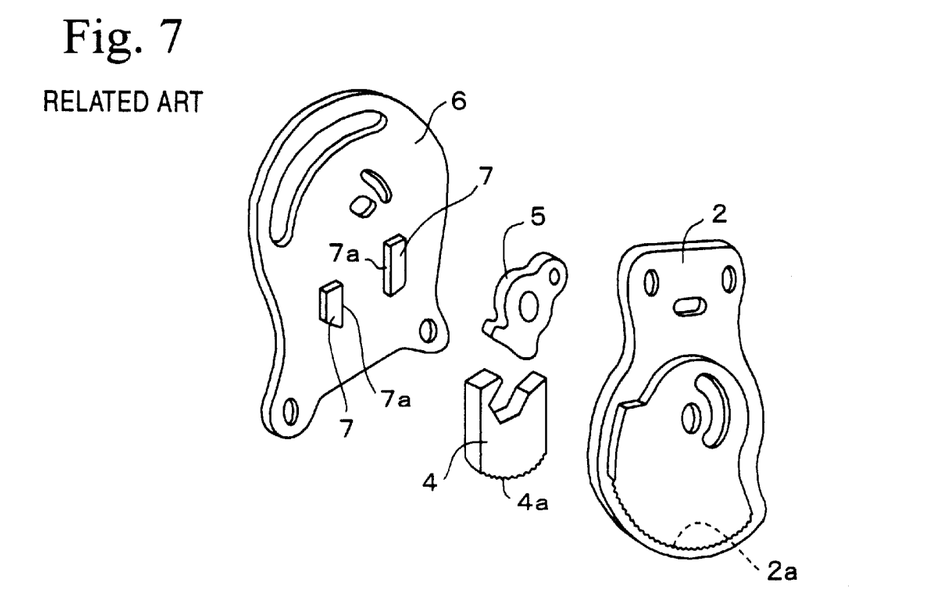
FIG. 7 is a perspective view showing another embodiment of the conventional reclining apparatus.

In general, in the case of sitting on a seat of an automobile and adjusting an angle of a seat back, a sitting person operates a canceling lever of a reclining apparatus so as to cancel an engaging condition of the seat back, thereby tilting backward the seat back by an upper half of the body of the sitting person, and forward tilting due to an elastic force of a spring provided in the reclining apparatus, so that the canceling lever is released at a desired position of the seat back so as to be engaged. FIG. 6 shows an embodiment of a conventional reclining apparatus. In FIG. 6, reference numeral 1 denotes a fixed plate and reference numeral 2 denotes a rotary plate. A semi-punched recessed portion 3 formed in accordance with a fine blanking is formed on one surface of the fixed plate 1. A slide gear 4 is received in the recessed portion 3 so as to freely slide in a vertical direction. The slide gear 4 is moved by a cam member 5 rotatably supported to the fixed plate 1, and a gear teeth portion 4a formed in a lower edge portion is detachably engaged with an internal gear 2a formed in the movable plate 2. FIG. 7 shows a structure in which a semi-punching process in a reverse direction to that in FIG. 6 is applied to a fixed plate 6, the slide gear 4 is slidably supported between convex portions 7 having guide surfaces 7a parallel to each other.

In this case, when the automobile is collided with the following car from the behind, a great load due to the passenger is applied to the seat back. Further, in the case that a shoulder anchor of the seat belt is attached to the seat frame, a great load of the passenger is applied to the seat back via a seat belt due to a head-on collision of the automobile. Further, in such a case, a great moment is applied to the reclining apparatus, and in the conventional reclining apparatus mentioned above, the following problems are generated.

Figure 8:
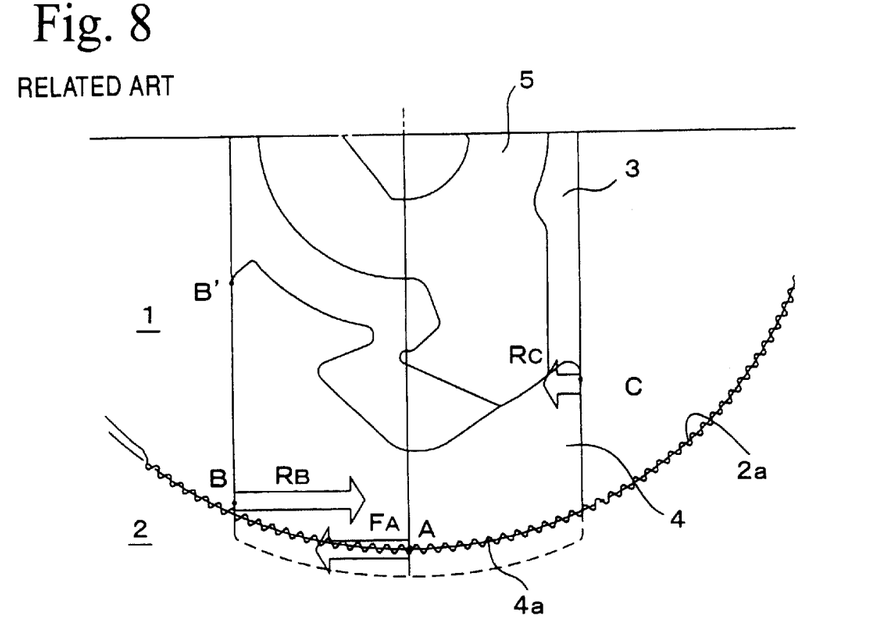
FIG. 8 is a plan view showing a slide gear and the like of the reclining apparatus shown in FIG. 6.
Figure 9:
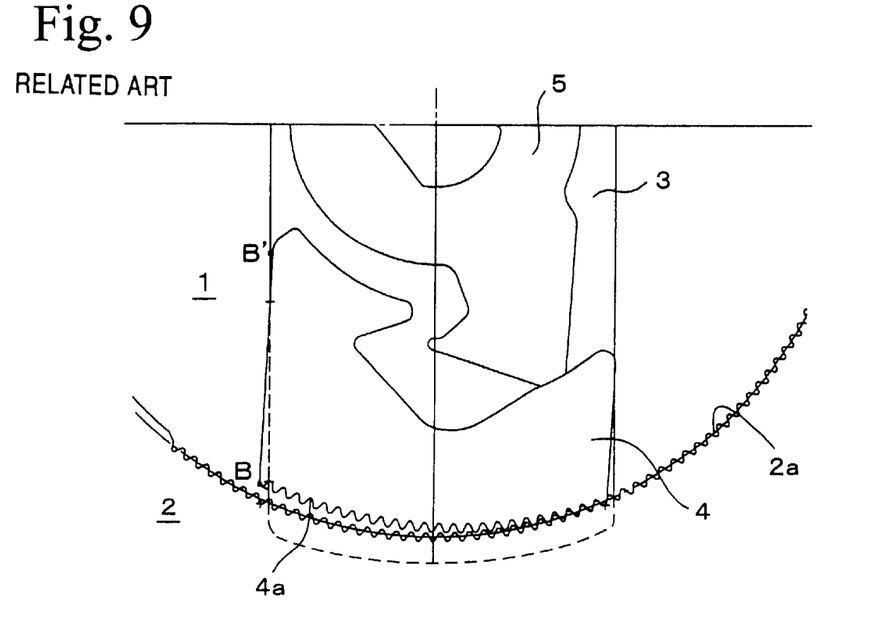
FIG. 9 is a plan view showing a condition that a guide portion deforms from a condition shown in FIG. 8.
Figure 10:
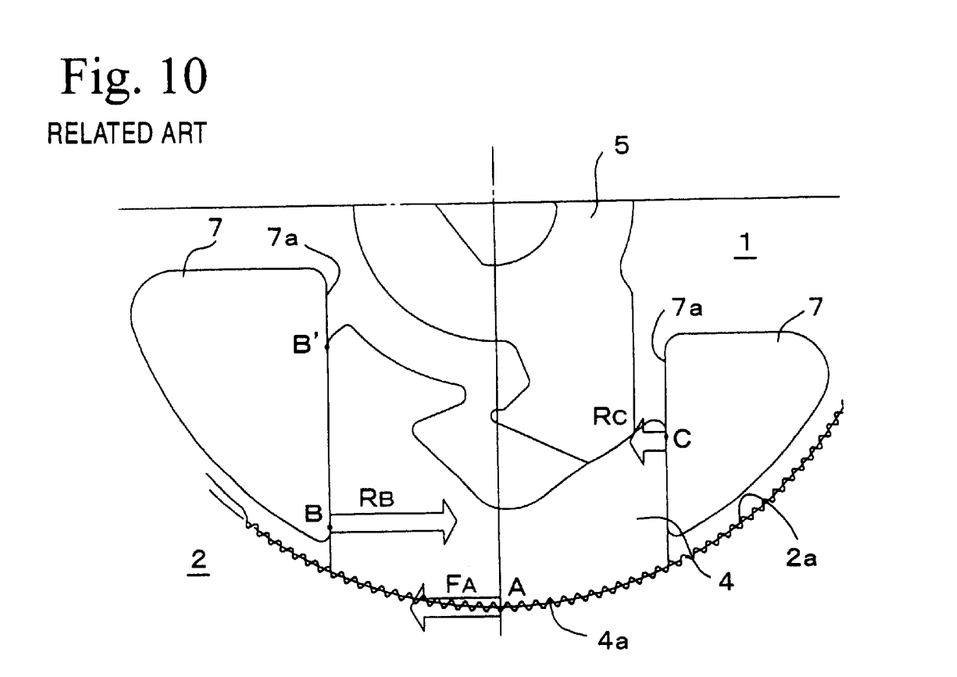
FIG. 10 is a plan view showing a slide gear and the like of the reclining apparatus shown in FIG. 7.
Figure 11:
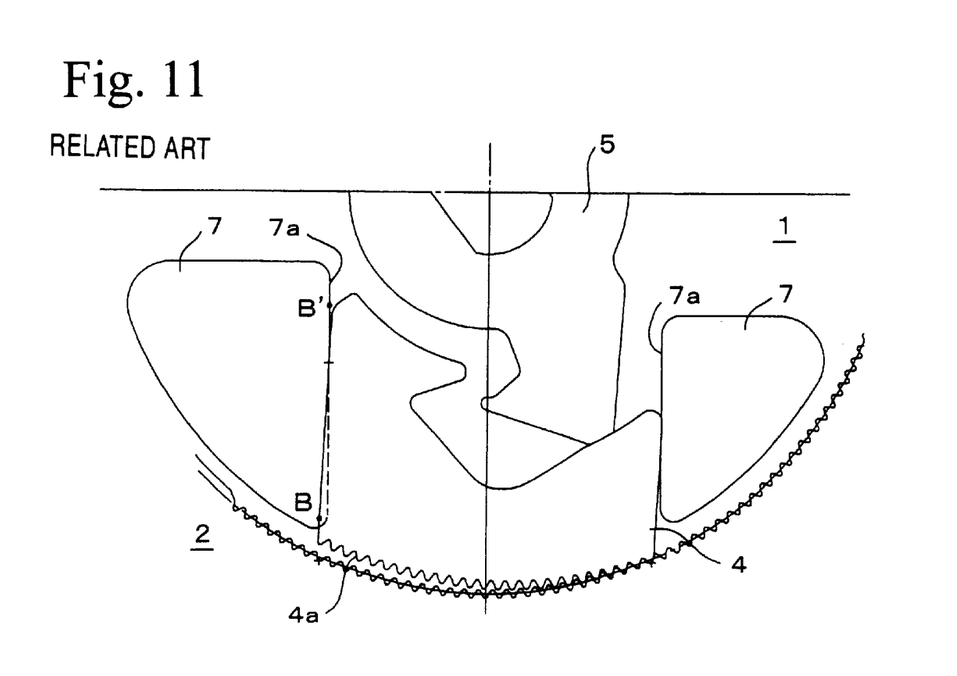
FIG. 11 is a plan view showing a condition that a guide portion deforms from a condition shown in FIG. 10.

That is, in the reclining apparatus shown in FIG. 6, when a load $F_A$ is input to the internal gear 2a of the movable plate 2, there is generated a load balance of a lever in which a point A is a power point, a point B is a supporting point and a point C is a working point in FIG. 8, a load $R_B$ greater than the load $F_A$ is applied to the point B on the fixed plate 1 and the load $R_B$ is received in a narrow range B–B' of the convex portion 7. Accordingly, a load concentrated in the point B is increased and a portion near the point B deforms, so that as shown in FIG. 9, the slide gear 4 is inclined and an engagement of gear in a left side in the drawing is out of place, whereby it is impossible to maintain a proper engagement. Further, the reclining apparatus shown in FIG. 7 has the same problem mentioned above, and a condition of deformation is shown in FIGS. 10 and 11.

SUMMARY OF THE INVENTION

Accordingly, an object of the present invention is to provide a reclining apparatus which in the case that an excessive load is input to an internal gear, can receive the load in a sufficient span so as to prevent respective portions from deforming.

In accordance with the present invention, there is provided a reclining apparatus comprising: a fixed plate in which a guide portion having a pair of mutually opposing guide walls is provided; a shaft provided in the fixed plate so as to freely rotate around an axis in a horizontal direction; rotary plate relatively rotating around the shaft with respect to the fixed plate and in which an internal gear is provided along a circular arc around the shaft; a slide gear received between respective guide walls of the guide portion and freely moving between a lock position engaged with the internal gear and a lock canceling position moving apart from the internal gear; and a cam member mounted to the shaft and rotated by the shaft, thereby moving the slide gear to the lock position and the lock canceling position, wherein a wall portion protruding toward the internal gear and the guide portion in a plan view is provided in the slide gear, and a side surface of the wall portion is slidably in contact with the guide portion.

In accordance with the reclining apparatus of the present invention, the rotary plate can rotate with respect to the fixed plate by rotating the shaft so as to move the slide gear apart from the internal gear. In this condition, by rotating the seat back and engaging the slide gear with the internal gear at a desired position, the seat back is fixed. Further, in accordance with the present invention, since the wall portion protruding toward the internal gear and the guide portion in a plan view is provided in the slide gear, and the side surface of the wall portion is slidably in contact with the guide portion, the longer side surface than the side surface of the slide gear is the slidably contact surface with respect to the guide portion. Accordingly, the side surface which is long and has a large area is slidably in contact with the guide portion by setting a thickness of the wall portion to be equal to or more than a thickness of the slide gear, whereby a concentration of a load applied to the guide portion is reduced and a deformation thereof is restricted.

In this case, it is preferable to employ a structure in which the wall portion is protruded toward the cam member so as to project overall the slide gear from the wall portion in the thickness direction thereof. That is, this structure corresponds to a structure in which the slide gear protrudes in an inner side of one surface of the wall portion in a stepped shape. In accordance with the structure mentioned above, it is possible to form the slide gear by a semi-punching in accordance with a fine blanking, and it is possible to reduce a manufacturing cost.

Figure 12:
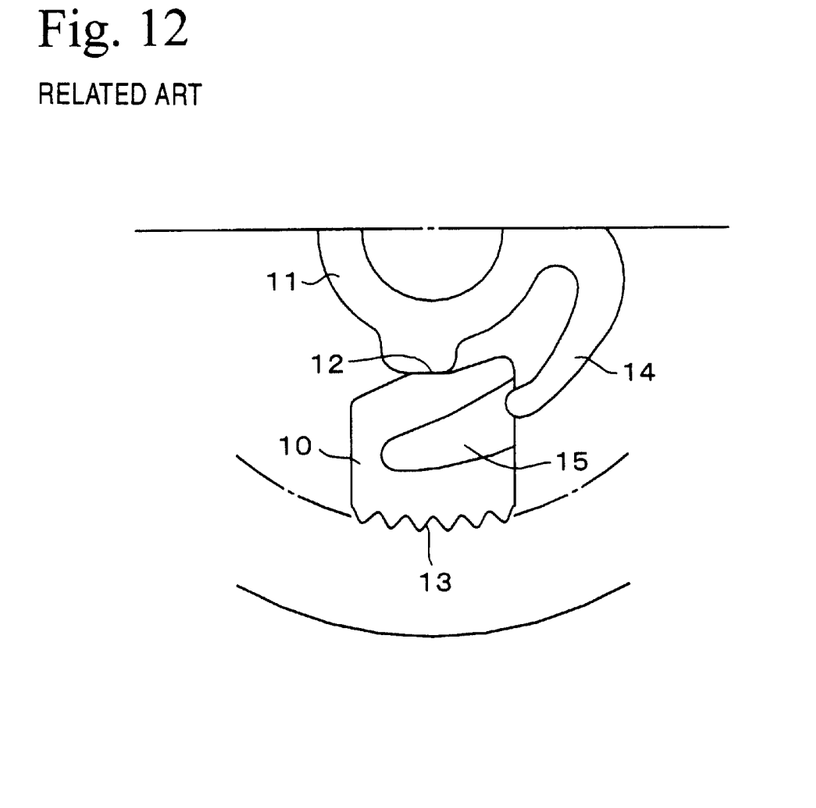
FIG. 12 is a plan view showing the other embodiment of the conventional reclining apparatus.

Further, it is desirable to structure such that the cam member presses an immediately rear side of the gear teeth portion of the slide gear. Accordingly, the pressing force of the cam member linearly applies to the gear teeth portion of the slide gear and it is possible to prevent a backlash such as a float-up in a thickness direction of the slide gear from being generated. Further, there is an advantage that it is possible to make the thickness of the cam member the same as the thickness of the slide gear so as to make it thin. Further, among the conventional reclining apparatus, there is a structure in which a groove 15 with which a convex portion 14 of a cam member 11 is engaged at a time of moving a slide gear 10 to a lock canceling position is formed between a pressing member 12 pressed by the cam member 11 among the slide gear 10 and a gear teeth portion 13, as shown in FIG. 12. In accordance with this structure, there is a fear that a stress concentration is generated at a corner of a groove 15 or the like due to the pressing fore of the cam member 11 and a durability is reduced. However, in accordance with the present invention, such a fear can be removed by making the structure such that the cam member presses the immediately upper side of the gear teeth portion.

DESCRIPTION OF THE PREFERRED EMBODIMENTS

A. STRUCTURE OF EMBODIMENT

Figure 1:
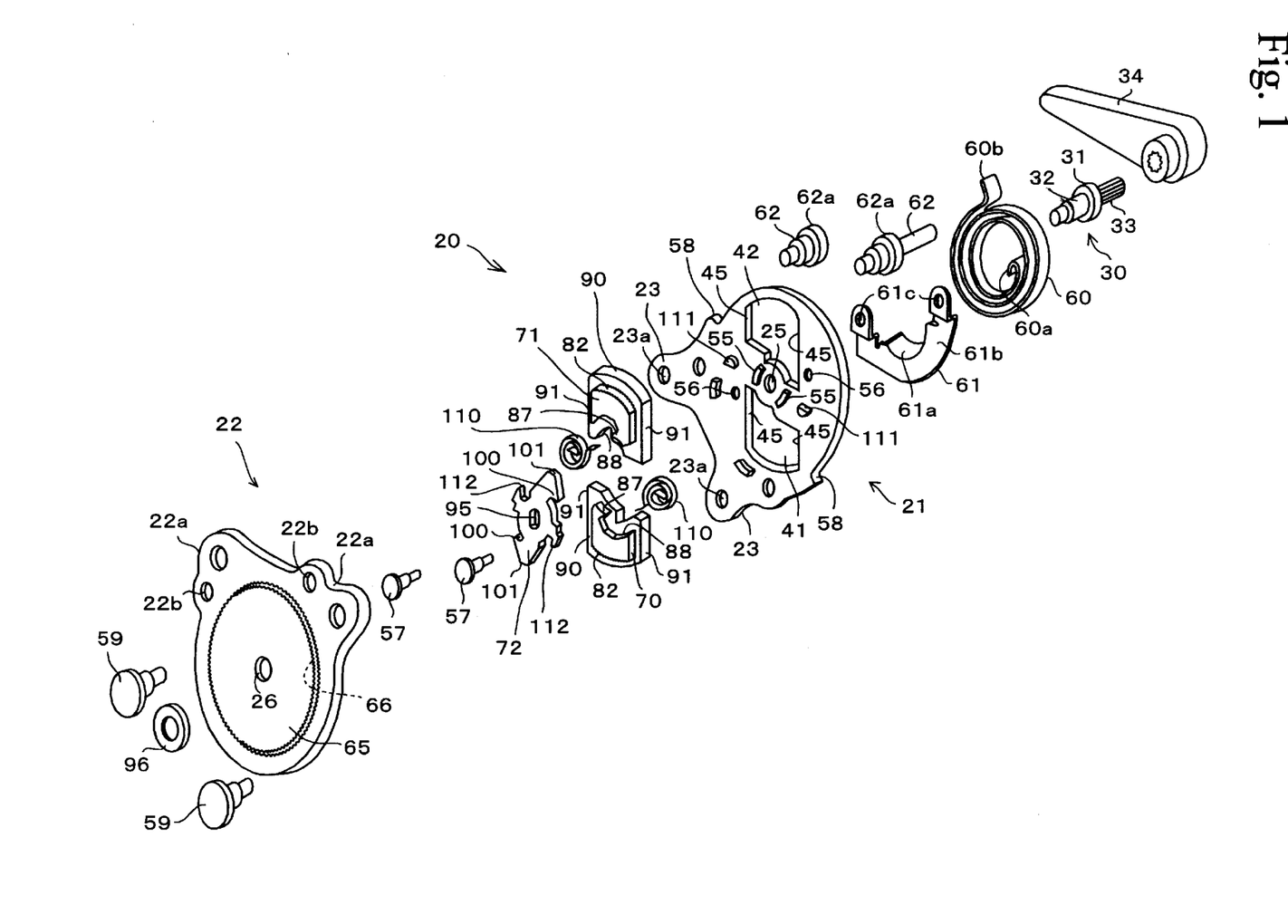
FIG. 1 is an exploded perspective view showing a reclining apparatus in accordance with an embodiment of the present invention.

A description will be given of an embodiment in accordance with the present invention with reference to FIGS. 1 to 5. FIG. 1 is an exploded perspective view showing a reclining apparatus 20 in a right side toward a forward moving direction in a seat for an automobile. The reclining apparatus 20 shown in FIG. 1 is provided with a fixed plate 21 fixed to a frame of a seat cushion of a seat in the automobile or the like, and a rotary plate 22 provided on the fixed plate 21. Both of the fixed plate 21 and the rotary plate 22 correspond to a press formed product made of a metal or a forged product in accordance with a cold forging or the like.

Two flange portions 23 and 23 protruding to an outer peripheral side are formed in the fixed plate 21 so as to be apart from each other in a circumferential direction. A hole 23a for inserting a bolt for mounting to a frame in a seat cushion side therethrough is formed each of the flange portions 23. Through holes 25 and 26 are formed in respective center portions of the fixed plate 21 and the rotary plate 22. A shaft 30 is inserted into the through holes 25 and 26 in a horizontal direction. The shaft 30 has a flange-like base portion 31, a cam mounting portion 32 having a star-shaped cross section (described only in FIG. 2), and a lever mounting portion 33. In this case, the shaft 30 freely rotates around an axis O thereof.

A first guide portion 41 and a second guide portion 42 recessed outward (a right side in FIG. 1) in accordance with a fine blanking. The first and second guide portions 41 and 42 include a pair of substantially parallel guide walls 45 opposing to each other. A pair of convex portions 55 formed in a circular arc shape which are protruded toward an inner side (a left side in FIG. 1) in accordance with a fine blanking are provided between the first and second guide walls 45. These convex portions 55 form a seat of a cam member 72 mentioned below. A pair of holes 56 are formed in an outer peripheral side of these convex portions 55. Further, a bracket 61 is mounted to an outer side of the fixed plate 21 by a pin 57 inserted to the hole 56.

The bracket 61 is constituted by a vertical plate portion 61a formed in a substantially semicircular tube shape, and a bottom plate portion 61b extending toward an outer peripheral side from the vertical plate portion 61a. Further, both end portions of the bottom plate portion 61b are bent so as to be stepped toward a side of the fixed plate 21, and a screw hole 61c is formed there. Then, the bracket 61 is mounted to the fixed plate 21 by fastening the pin 57 to the screw hole 61c.

The rotary plate 22 can relatively rotates freely around the shaft 30 with respect to the fixed plate 21. A flange portion 22a protruding to an outer peripheral side is formed in the rotary plate 22, and a holding member 62 is fixed to a hole 22b formed in the flange portion 22a. on the contrary, the stoppers 58 and 58 protruding to the outer peripheral side are integrally formed in the fixed plate 21, and any one of the pins 62 is brought into contact with the stopper 58, whereby a rotating range of the rotary plate 22 is limited. The spiral spring 60 is mounted so that the bracket 61 is received in the center space portion thereof, and the end portion 60a in the inner peripheral side thereof is engaged with the vertical plate portion 61a of the bracket 61. Further, the end portion 60b in the outer peripheral side of the spiral spring 60 is engaged with one of the pins 62 in a condition of twisting the spring 60. Accordingly, a torque around the shaft 30 (a torque in a direction of forward tilting the seat back) is applied to the rotary plate 22.

In this case, a flange 62a is formed in a center portion of each of the pins 62, and the fixed plate 21 is held between the flange 62a and the rotary plate 22. Further, a pin 59 having a flange-shaped head portion is fixed to the fixed plate 21 along the outer periphery of the rotary plate 22, and the rotary plate 22 is held between the head portion of the pin 59 and the fixed plate 21. The pins 62, 62, 59 and 59 are arranged at four portions in the circumferential direction substantially in a uniform manner, and when the load moving the fixed plate 21 apart from the rotary plate 22 is applied, supports the load substantially in a uniform manner so as to prevent both the elements from moving apart from each other.

Next, an offset formed portion 65 formed so as to half recessed substantially in a circular shape toward an inner side is formed in the rotary plate 22. In this offset formed portion 65, a surface facing to the fixed plate 21 is formed in a recess shape, and an internal gear 66 is formed on an inner peripheral surface thereof. The internal gear 66 is formed along a circular arc around a through hole 26 through which the shaft 30 passes. In this case, a gear-like portion described in the rotary plate 22 in FIG. 1 is formed by a carved surface of a female die at a time of press forming the internal gear 66.

A pair of slide gears 70 and 71 are received in a space portion formed between an inner fixed plate 21 and the rotary plate 22 in the offset formed portion 65, and a cam member 72 is received in an intermediate of the slide gears 70 and 71. The slide gears 70 and 71 can move along the guide walls 45 and 45. The slide gears 70 and 71 are formed so as have the same shape and the same size, and are arranged symmetrical with respect to a point around the shaft 30.

Figure 4A:
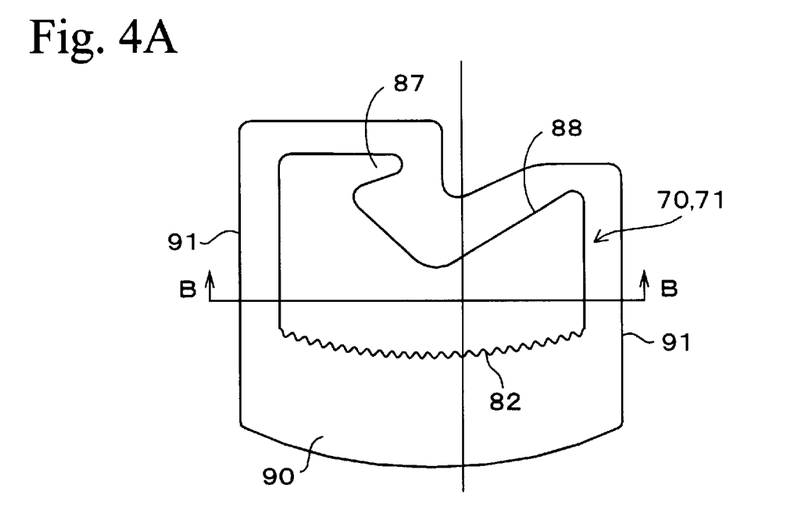
FIG. 4A is a plan view showing details of a slide gear.
Figure 4B:
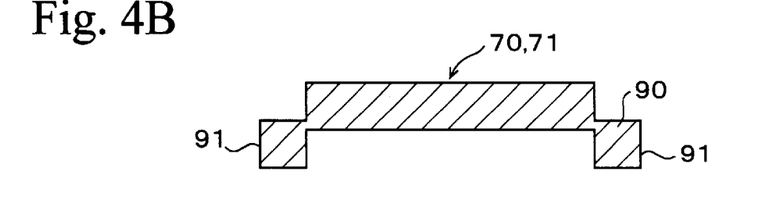
FIG. 4B is a cross sectional view along a line B—B in FIG. 4A.
Figure 5:
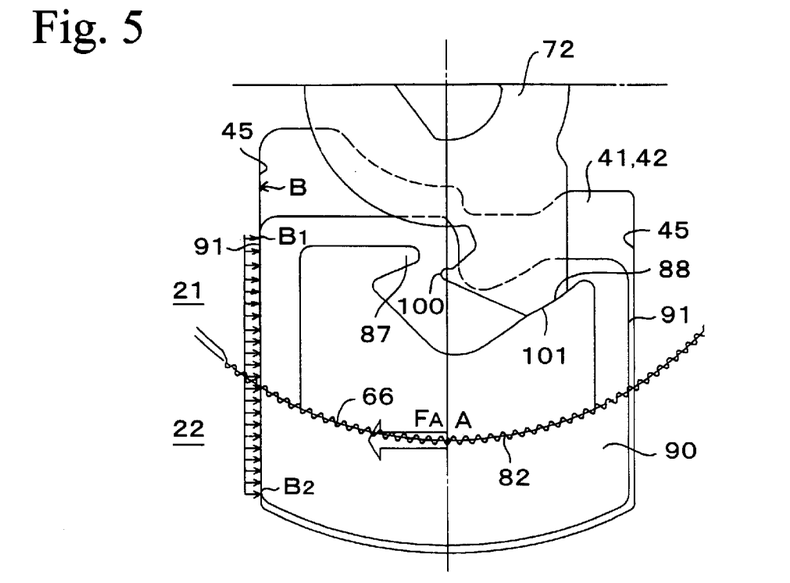
FIG. 5 is a plan view showing an operation of the slide gear in accordance with the embodiment.

A gear teeth portion 82 capable of engaging with and disengaging from the internal gear 66 is formed in a front end portion of the slide gears 70 and 71, as shown in FIGS. 4 and 5. A convex potion 87 protruding in a direction being along the gear teeth portion 82 is formed in a base end side of the slide gears 70 and 71, and a hook 100 of a cam member 72 mentioned below is inserted to an inner side of the convex portion 87. Further, a cam surface 88 pressed by a cam surface 101 of the cam member 72 at a time of the lock condition is formed in a portion opposing to the convex portion 87. Further, wall portions 90 protruding toward all peripheral directions of the slide gears 70 and 71 in a plan view are formed on surfaces facing to the outer sides of the slide gears 70 and 71 structured in the manner mentioned above.

The wall portions 90 are formed in a shape substantially corresponding to a plan shape of the slide gears 70 and 71, and have mutually parallel side surfaces 91. The wall portions 90 are received in the guide portions 41 and 42, and the side surfaces 91 are slidably in contact with the guide walls 45 of the guide portions 41 and 42. In this case, as shown in FIG. 4, the slide gears 70 and 71 and the wall portions 90 are integrally formed in accordance with a fine blanking.

Next, a hole 95 having a star-shaped cross sectional shape is formed in a center portion of the cam member 72, and a cam mounting portion 32 of the shaft 30 is fitted to the hole 95. Further, as shown in FIG. 3, the structure is made such that the shaft 30 does not come off from the cam member 72 by inserting the shaft 30 to the fixed plate 21 and the rotary plate 22 from the outer side (right side) and caulking (shown by reference numeral 97 in FIG. 3) an edge portion of the shaft 30 through a washer 96 to the shaft 30 from an inner side. A pair of hooks 100 symmetrical with respect to a point are formed in the cam member 72. These hooks 100 are inserted into inner sides of the respective convex portions 87 of the slide gears 70 and 71. Further, a pair of cam surfaces 101, which are symmetrical with respect to a point and is capable of pressing the respective cam surfaces 88 of the slide gears 70 and 71, are formed in the cam member 72. These cam surfaces 101 press the cam surfaces 88 of the slide gears 71 and 72 at a time when the cam member 72 is positioned at the lock position shown in FIG. 2, thereby pressing the slide gears 70 and 71 toward the internal gear 66.

Figure 2:
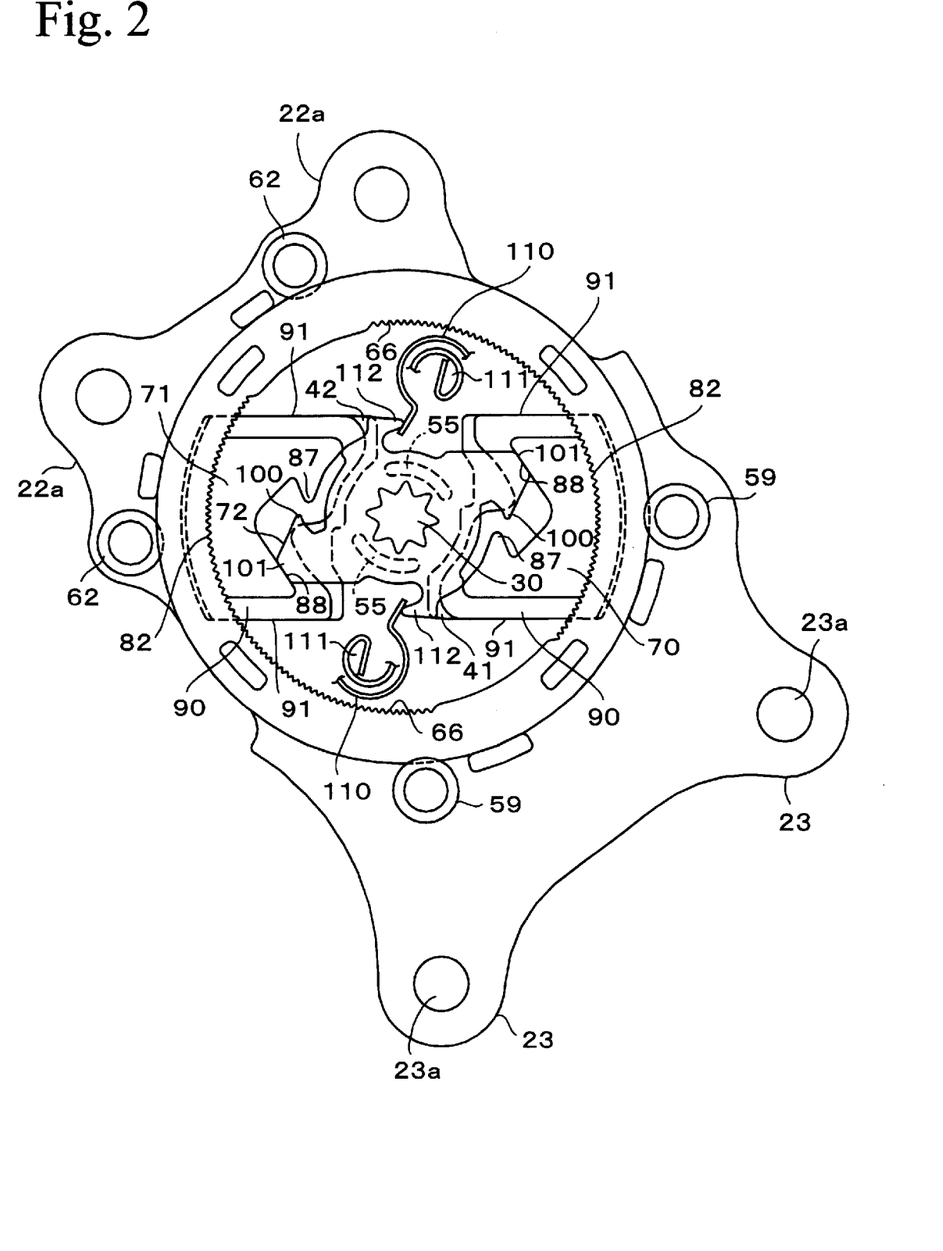
FIG. 2 is a cross sectional view showing a condition of cutting the reclining apparatus in accordance with the embodiment at a portion of an internal gear of a rotary plate.
Figure 3:
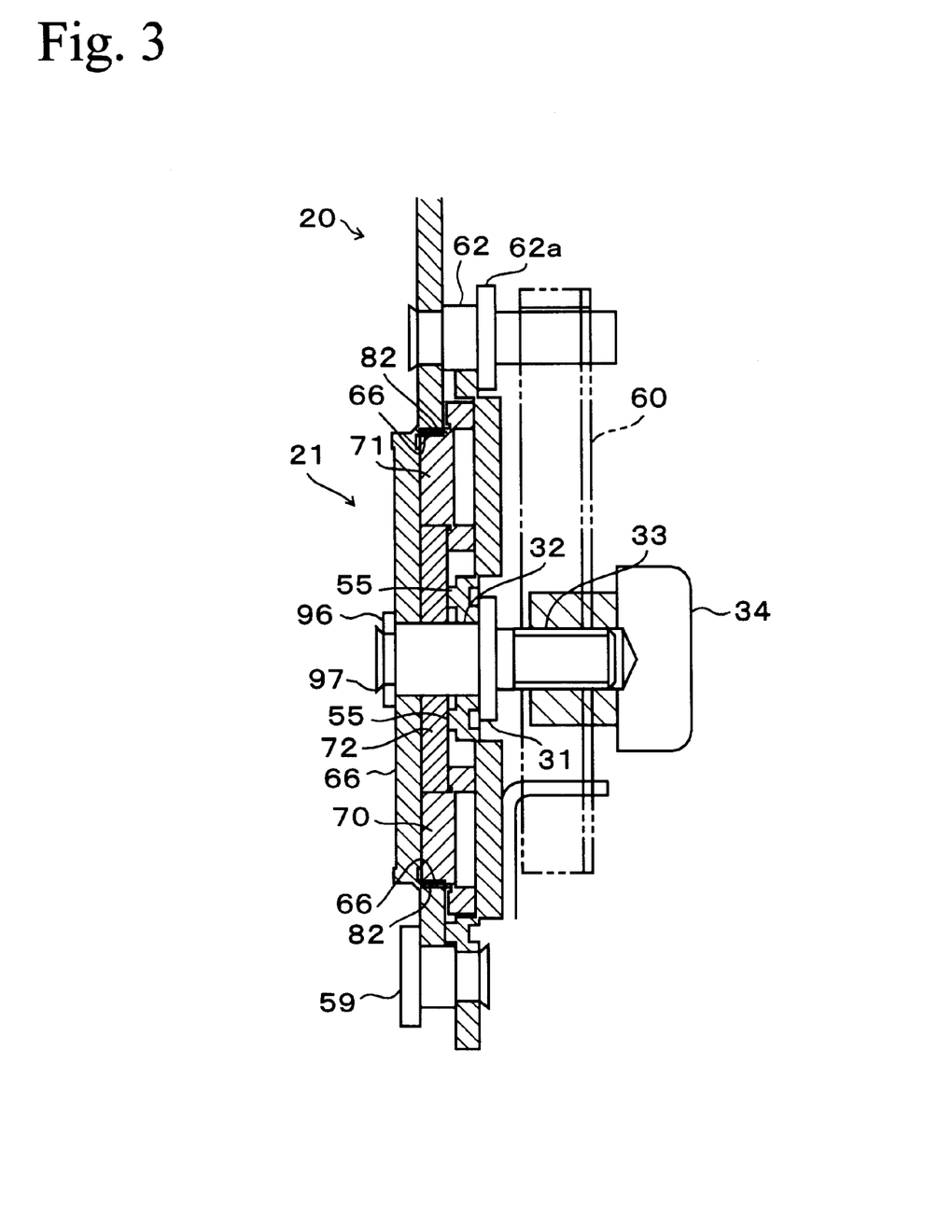
FIG. 3 is a cross sectional view of the reclining apparatus shown in FIG. 2.

The hook 100 of the cam member 72 engages with the convex portions 87 of the slide gears 70 and 71 at a time when the cam member 72 rotates in a lock canceling direction in a clockwise direction in FIG. 2, thereby attracting the slide gears 70 and 71 in a direction moving close to the shaft 30. The cam member 72 having the structure mentioned above is always urged to a direction of the lock position (a clockwise direction in FIG. 2) by a return spring 110 shown in FIG. 1. In the case of the illustrated embodiment, two return springs 110 are used, and are set between a spring hooking portion 111 provided in the fixed plate 21 and a spring receiving portion 112 provided in the cam member 72 in a condition of being twisted so as to generate a torque urging the cam member 72 in the direction of the lock position.

B. OPERATION OF EMBODIMENT

Next, a description will be given of an operation of the reclining apparatus 20 having the structure mentioned above. In the lock condition shown in FIG. 2, the slide gears 70 and 71 are pressed to the internal gear 66 by the cam surface 101 of the cam member 72, and the internal gear 66 and the gear teeth portion 82 of the slide gears 70 and 71 are engaged with each other, whereby the rotary plate 22 is fixed to the fixed plate 21. That is, the seat back becomes in a condition of being fixed.

By operating the operating lever 34 in the lock canceling direction (upward in FIG. 1) under this condition, the hook 100 is engaged with the convex portion 87 so as to draw the slide gears 70 and 71 toward the shaft 30. Accordingly, the slide gears 70 and 71 move apart from the internal gear 66, whereby the engagement between the both is taken out. In this lock canceling condition, since the restriction of the rotary plate 22 due to the slide gears 70 and 71 is canceled, the rotary plate 22 can rotate around the shaft 30 with respect to the fixed plate 21.

By changing the tilt angle of the seat back under the lock canceling condition mentioned above, the rotary plate 22 rotates while sliding on a back surface of the fixed plate 21. Further, by setting the seat back to a desired position and canceling the operating force of the lever 34, the cam member 72 returns to the lock position shown in FIG. 2 due to an elastic force of the return spring 110 and the operating lever 34 returns to the original position. Accordingly, the slide gears 70 and 71 engage with the internal gear 66 and the rotary plate 22 is fixed.

In accordance with the reclining apparatus 20 having the structure mentioned above, the wall portion 90 is integrally formed with the slide gears 70 and 71 and the wide side surface 91 of the wall portion 90 is slidably in contact with the guide wall 45 in the guide portions 41 and 42, the side surface 91 longer and wider than the side surface in the slide gears 70 and 71 forms the slidably contact surface with the guide wall 45, as shown in FIG. 5. Accordingly, even in the case that a great load $F_A$ is input to the internal gear 66, the load $F_A$ can be shared by a wide range shown by $B_1$–$B_2$. Therefore, since the concentration of the load applied to the guide wall 45 is accommodated and the deformation thereof is restricted, it is possible to maintain a proper engagement between the gear portion 82 in the slide gears 70 and 71 and the internal gear 66.

In particular, in the embodiment mentioned above, since the wall portion 90 is protruded in overall the peripheral directions of the slide gears 70 and 71, it is possible to form the semi-punched slide gears 70 and 71 in accordance with a fine blanking, and reduce a manufacturing cost. Further, since the structure is made such that the cam member 72 presses the side close behind the gear teeth portion 82 in the slide gears 70 and 71, the pressing force of the cam member 72 is linearly applied to the gear teeth portion 82 in the slide gears 70 and 71, whereby it is possible to prevent the backlash such as the float-up of the slide gears 70 and 71 in the thickness direction from being generated, and there is not generated a problem that the stress is concentrated in the corner portion which is generated in the case that the engagement groove is provided in the middle portion. Further, in the structure mentioned above, there is an advantage that the thickness of the cam member 72 can be made the same small thickness as the thickness of the slide gears 70 and 71.

In this case, in accordance with the embodiment mentioned above, the description is given of the case that the slide gears 70 and 71 are relatively arranged symmetrical with respect to a point around the shaft 30, however, the structure is not limited to this, and it is possible to also apply to the structure having one slide gear 4 which is described as the prior art.

What is claimed is:

1. A reclining apparatus comprising:
   a fixed plate in which a guide portion having a pair of mutually opposing guide walls is provided
   a shaft provided in the fixed plate so as to freely rotate around an axis in a horizontal direction;
   a rotary plate relatively rotating around the shaft with respect to the fixed plate and in which an internal gear is provided along a circular arc around the shaft;
   a slide gear having a leading end portion and trailing end portion, the slide gear received between respective guide walls of the guide portion and freely moving along the guide walls between a lock position at which the leading end portion engages with the internal gear and a lock canceling position moving apart from the internal gear; and a cam member having a front surface and a back surface, the cam member mounted to the shaft and rotated by the shaft, thereby pushing the trailing end portion of the slide gear and moving the slide gear to the lock position, and engaging with the slide gear so as to move the slide gear to the lock canceling position;

wherein a flange portion protruding in overall the circumferential direction around the slide gear in a plan view is provided on a back surface of the slide gear, and opposite side surfaces of the flange portion is slidably in contact with the guide portion, and a front surface of the flange portion is slidably in contact with the back surface of the cam member.

2. A reclining apparatus as claimed in claim 1, wherein a thickness of the flange portion is equal to or more than a thickness of the slide gear, whereby the side surface of the wall portion has a larger area slidably in contact with the guide portion than a side surface of the slide gear.

3. A reclining apparatus as claimed in claim 1, wherein of the slide gear is formed at a portion which is semi-punched by a fine blanking.

4. A reclining apparatus as claimed in claim 1, further comprises:

a recess formed in the trailing end portion of the sliding gear, the recess being concaved toward the leading end portion of the sliding gear so as to form a bottom surface at a leading side of the recess and an opening at a trailing end of the recess; and a protrusion formed at a trailing side end of the opening in the vicinity of a side surface of the slide gear, the protrusion projecting along a direction to which the internal gear extends;

wherein, the cam member pushes the bottom surface of the recess so as to push the slide gear to the internal gear, and engages with the protrusion so as to separate the slide gear from the internal gear.

5. A reclining apparatus as claimed in claim 4, wherein the cam member comprises a cam accommodated in the recess, the cam comprises a cam surface which pushes the bottom surface of the recess and a hook which engages with the protrusion.

* * * * *